C. T. HENDERSON.
MOTOR CONTROLLER.
APPLICATION FILED MAR. 6, 1914.
1,196,778.
Patented Sept. 5, 1916.
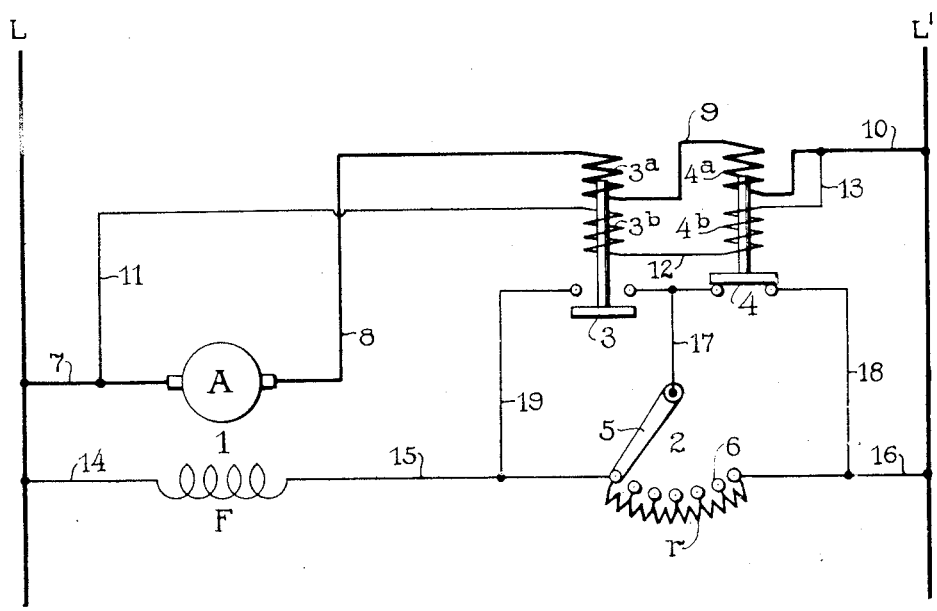

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,196,778.

Specification of Letters Patent.

Patented Sept. 5, 1916.

Application filed March 6, 1914. Serial No. 822,862.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to motor controllers.

The various objects and advantages of the invention will be apparent from the embodiment thereof diagrammatically illustrated in the accompanying drawing and now to be described.

Referring to the drawing, the same shows a shunt motor 1 having an armature A and a shunt field winding F. It also shows a conventional form of adjustable field rheostat 2 for regulating the speed of the motor, and two relay switches 3 and 4 coacting with said rheostat to automatically regulate the field strength of the motor, as hereinafter set forth.

The rheostat 2 is shown as comprising a pivoted arm 5 movable over a series of contacts 6 to vary a resistance $r$. When in the position illustrated the arm short-circuits all of the resistance $r$ from the field circuit of the motor and when moved to the right gradually inserts said resistance in said circuit.

The relay switch 3 is normally open and controls a short circuit around that portion of the resistance $r$ included in circuit by the rheostat arm 5 when moved to the right. This switch has a winding $3^a$ in series with the motor armature and an auxiliary winding $3^b$ connected across the lines. During the acceleration of the motor these two windings act cumulatively to effect closure of the switch 3 whenever the armature current exceeds a predetermined value. Closure of the switch 3 in turn short-circuits the resistance $r$ included in the field circuit, thereby strengthening the motor field and effecting a reduction in the armature current. The relay 3 vibrates, alternately excluding and including the field resistance until the motor attains such speed as to enable the field resistance to be left in circuit without overloading the armature. It thereby protects the motor against too rapid removal of the field resistance by the rheostat arm. When, however, as often occurs in deceleration, the motor acts as a generator to return power to the lines, the two windings of the relay act in opposition to insure against response of the relay.

The provision of the two windings for the relay 3 is important and extremely advantageous for the following reasons: When the motor acts as a generator it frequently occurs that the current generated thereby attains or exceeds the value at which the relay 3 is set to respond in acceleration. Accordingly should the relay be free to respond then it would short-circuit the field resistance, increasing the field strength and augmenting the current delivered by the armature. This would be extremely undesirable since the motor requires substantially the same protection against excessive current when acting as a generator as when operating upon power from the lines and the effect of the relay would be just the opposite of that desired. Provision of the two windings as aforesaid, however, positively insures against operation of the relay, and in so doing overcomes the difficulties discussed.

As before stated, the motor requires protection when acting as a generator and it is to afford such protection that the relay switch 4 is provided. This switch is normally closed to complete a short-circuit around that portion of the resistance to the right of the rheostat arm 5. It is provided with two windings $4^a$ and $4^b$ which oppose one another when the motor operates upon power from the lines and which act cumulatively when the motor acts as a generator. Accordingly these windings function just the reverse of those of relay 3, whereby said switch 4 is rendered ineffective during acceleration. When, however, the motor acts as a generator and the current delivered thereby exceeds a certain value the two windings act together to open the relay switch 4 to insert in the field circuit that portion of the resistance short-circuited by the rheostat arm. This, in turn, decreases the field strength of the machine and thereby effects a reduction of the current delivered by the armature and so long as the current generated tends to exceed the predetermined value the relay switch 4 vibrates similarly to the relay 3 to protect the motor. Thus the means illustrated provides for equal protection of the motor under running and generating conditions and all danger of interference between the protective means is eliminated by the duplex windings thereof. It is, of course, understood that the windings of the two relays may be of such design as to effect response and inertness thereof at any desired current values.

More specifically describing the circuit connections, the same are as follows: Current is supplied from lines L and L' and from line L one circuit extends by a conductor 7 through the motor armature A, by conductor 8 through the winding $3^a$ of relay 3, by conductor 9 through winding $4^a$ of relay 4, by conductor 10 to line L'. This provides for series connection of the motor armature and the relay windings $3^a$ and $4^a$.

A second circuit extends from conductor 7 by conductor 11 through the winding $3^b$ of relay 3, by conductor 12 through the winding $4^b$ of relay 4, by conductor 13 to conductor 10. This provides for connection of the two windings $3^b$ and $4^b$ in series across the lines.

A third circuit extends from line L by conductor 14 through the motor field winding F, by conductor 15 through resistance $r$, by conductor 16 to line L'. The rheostat arm 2, however, is connected by conductor 17 through relay switch 4, by conductor 18 to conductor 16, whereby said rheostat arm may be moved to short circuit all or any desired part of the resistance $r$ from the field circuit. At the same time these connections provide for inclusion of all of the resistance $r$ in the field circuit when the switch 4 opens.

The remaining circuit extends from conductor 15 by conductor 19 through switch 3 to conductor 17 and rheostat arm 2, and, as is apparent, this circuit when completed short-circuits all of the resistance $r$ to the left of the rheostat arm, or in other words, that portion of the resistance included in the field circuit by said rheostat arm.

With the circuit connections just described it will be apparent that the direction of flow of current through the relay windings $3^b$ and $4^b$ will always be the same while the flow of current through the windings $3^a$ and $4^a$ will be subject to reversal when the motor acts as a generator. Thus is effected the aforesaid changes in the coaction of said windings.

What I claim as new and desire to secure by Letters Patent is:

1. In a motor controller, in combination, a field resistance, means for removing said resistance from circuit in steps and a current relay responsive to reinsert in circuit the steps of said resistance excluded by said means.

2. In a controller for electric motors, in combination, a field resistance, means for including and excluding said resistance in sections, means operable automatically to exclude from circuit that portion of said resistance included in circuit by said first-mentioned means, and other means operable automatically to include in circuit that portion of said resistance excluded by said first mentioned means.

3. In a controller for electric motors, in combination, a field resistance, means for including and excluding said resistance in steps, a switch operable to exclude that portion of the resistance included by said means, another switch operable to include that portion of said resistance excluded by said means, and means for automatically operating said switches under different conditions and rendering each inoperative under operative conditions of the other.

4. In a controller for electric motors, in combination, a field resistance, means for including and excluding said resistance in steps, a switch operable to exclude that portion of the resistance included by said means, another switch operable to include that portion of said resistance excluded by said means, and electro-responsive means for operating said switches under different conditions and insuring against operation of each upon operation of the other.

5. In a controller for electric motors, in combination, a resistance, a switch operable to exclude said resistance from circuit, a switch operable to include said resistance in circuit, and a plurality of windings for each of said switches, the windings of each switch acting cumulatively and in opposition under different conditions, and connections for said windings insuring reverse actions of the windings of said switches under all conditions.

6. In combination, an electric motor, a field resistance therefor, and means responsive to the current supplied to said motor to exclude said resistance from circuit, said means having associated therewith means to insure against its operation when said motor acts as a generator.

7. The combination with an electric motor, of a field resistance therefor, and a relay switch controlling said resistance, said switch having a winding in series with the motor armature and an independently excited winding, said windings acting cumulatively during operation of said motor upon power supplied from the lines and acting in opposition when said motor acts as a generator.

8. In a controller for electric motors, in combination, a field resistance, a relay operable to exclude said resistance from circuit, a relay operable to include said resistance in circuit, each of said relays having two windings and connections for subjecting one winding of each of said relays to the armature current and for independently energizing the other winding of each relay, whereby the windings of each relay may act either cumulatively or in opposition and are insured a reverse action to that of the windings of the other relay.

9. In combination, a source of power, a motor to operate upon power from said source and under certain conditions to act as a generator to reverse the flow of current in its armature circuit, a field resistance, two relays, one operable to include and the other operable to exclude said resistance for limiting the armature current to a predetermined value during acceleration and deceleration, and electro-responsive means to operate said relays selectively in accordance with the direction of flow of the armature current.

10. In combination, a source of power of substantially constant potential, a motor supplied with power therefrom, a field resistance, means for increasing said field resistance for acceleration of said motor and decreasing said resistance for deceleration thereof, means effective during acceleration for decreasing said resistance when the armature current exceeds a predetermined value, and means effective during deceleration to increase said resistance when the armature current exceeds a predetermined value, said second mentioned means being inoperative during deceleration and said third mentioned means being inoperative during acceleration.

In witness whereof, I have hereunto subscribed my name in the presence of two witnesses.

CLARK T. HENDERSON.

Witnesses:
 L. F. WATSON,
 LEHLA BAST.